United States Patent
Lee et al.

(10) Patent No.: US 6,332,362 B1
(45) Date of Patent: Dec. 25, 2001

(54) DEVICE AND METHOD FOR DETECTING ANOMALY OF AIR CONDITIONER BY USING ACOUSTIC EMISSION METHOD

(75) Inventors: Kam Gyu Lee; Jung Suk Kim; Myoung Chang Kang, all of Pusan-shi; Jun Ha Kim, Kyongsangnam-do, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/651,279

(22) Filed: Aug. 30, 2000

(30) Foreign Application Priority Data

Apr. 18, 2000 (KR) .................................................. 00/20269
Apr. 18, 2000 (KR) .................................................. 00/20270
Apr. 18, 2000 (KR) .................................................. 00/20271

(51) Int. Cl.[7] ....................................................... G01H 1/00
(52) U.S. Cl. .................................... 73/659; 73/587; 73/660
(58) Field of Search ............................. 73/570, 660, 658, 73/659, 587, 591; 340/683

(56) References Cited

U.S. PATENT DOCUMENTS

| 4,429,578 | * | 2/1984 | Darrel et al. ........................... 73/659 |
| 5,159,563 | * | 10/1992 | Miller et al. ............................ 73/660 |
| 5,445,027 | * | 8/1995 | Zorner ..................................... 73/579 |
| 5,618,993 | * | 4/1997 | Matsumoto et al. .................... 73/587 |
| 5,942,690 | * | 8/1999 | Shvetsky ................................. 73/660 |
| 6,116,089 | * | 9/2000 | El-Ibiary et al. ....................... 73/593 |

* cited by examiner

Primary Examiner—Hezron Williams
Assistant Examiner—Jacques Saint-Surin
(74) Attorney, Agent, or Firm—Fleshner & Kim, LLP

(57) ABSTRACT

Device and method for detecting anomaly of an air conditioner, the method including the steps of (1) detecting an acoustic emission signal from a compressor in the air conditioner during operation of the air conditioner, (2) detecting parameters of particular components from the detected acoustic emission signal, and (3) comparing the detected parameters to respective references, to determine anomaly of the air conditioner on the whole, whereby permitting the most reliable detection of anomaly of the air conditioner.

15 Claims, 7 Drawing Sheets

DEVICE AND METHOD FOR DETECTING ANOMALY OF AIR CONDITIONER BY USING ACOUSTIC EMISSION METHOD

BACKGROUND OF THE INVENTION

1. Field of the Invention

The present invention relates to device and method for detecting defect in an air conditioner, and more particularly, device and method for detecting anomaly of an air conditioner by using the acoustic emission method.

2. Background of the Related Art

The air conditioner, maintaining a room temperature at a desired level, has a refrigerant compressor essentially required for compression of the refrigerant in conversion of a phase of the refrigerant. What gives the most fatal influence to an anomaly of the air conditioner in whole is the compressor. FIG. 1 illustrates a related art outdoor unit of an air conditioner.

Referring to FIG. 1, there is a compressor 100 mounted on a base plate 18 between a front casing and a rear casing 10 and 12 of the outdoor unit. The refrigerant compressed in such a compressor is passed through a phase change as the refrigerant discharges a heat at a heat exchanger 14, and supplied to an indoor unit(not shown).

A system of the related art compressor 100 in an air conditioner will be explained with reference to FIGS. 2 and 3. As shown, the compressor 100 is provided with a case 101 having a built in mechanism for compressing the refrigerant, and an accumulator 103 for supplying the refrigerant into the compressor. Within the case 101, there is a motor 102 for generating a power for compressing the refrigerant and a compression part for compressing the refrigerant by using the power generated at the motor. The compression part has a cylinder 105 with a suction hole 104, and a compression chamber 108 between an upper and lower bearings 106 and 107. In the compression chamber 108, there is an eccentric shaft 109 rotatably fixed in the compression chamber 108 as shown in FIG. 3. And, on the eccentric shaft 109, there is a rolling piston 110 mounted thereon for making continuous contact to an inside surface of the compression chamber 108.

In such a system, when the power is applied to the compressor, the motor 102 in the case 101 comes into operation, to rotate the eccentric shaft 109, when the rolling piston 110 rotates along an inside wall of the compression chamber 108, to an outside diameter of which rolling piston 110 a vane 111 elastically fitted in the cylinder 105 by a spring 112 is brought into contact periodically, to draw the refrigerant from the accumulator 103 into the compression chamber 108 through the suction hole 104 in the cylinder 105. The refrigerant drawn thus is compressed as the rolling piston 110 rotates, and discharged to outside of the compressor through an outlet. Being an important part a basic performance of a refrigerating cycle relies thereon, a defective compressor gives a fatal influence to entire air conditioner. And, this influence gives a fatal influence to defects of entire air conditioner actually, an inspection of the compressor itself is very important. Since the detect in the compressor itself directly affects to the detect in the air conditioner itself actually, the detect in the compressor is a criterion for determining a detect in the air conditioner. However, determination of the defect in the compressor itself only from mechanism by an outer appearance is not easy. And, what is important is determination of detect in the air conditioner itself actually, it is a right approach in determination of the detect in the air conditioner that the determination of defect is only made in a state the compressor is assembled to complete an air conditioner.

A related art method for determining a detect in a completed air conditioner on the whole will be reviewed, briefly. The most primary established method is to determine the defect an air conditioner from noise and vibration relying on auditory and visual senses of a skilled worker after putting a completed air conditioner into a rated power operation on an air conditioner production line. However, since this sense based method is influenced from an environment of the production line and the inspector's subjective view, reliability of the method can not be assured, fully. And, because of the problem of this sense based determination method, a method is widely used, in which an operational current is sensed by using a sensing device on a transfer line of the air conditioner, and the detect in the air conditioner is determined based on the sensed current.

However, this current sensing method has disadvantage in that a right determination of the air conditioner is impossible in cases of abnormal wear and the like of components coming from unbalance of materials, machining error and/or assembly error, or the like of components because the current sensing method is based on currents for general factors, such as low compression, reverse discharge, electronic noise, abnormal noise, low input, and the like of the compressor in case of two phases. For example, a right determination of detect in the air conditioner is not possible in cases the defect comes from a machining or assembly error of various components in the compressor. To cope with this, the inventor discloses a patent in Korean Patent publication No. 192251 dated Jun. 15, '99 in which a method for determining anomaly of a compressor by using an acoustic emission method is suggested. However, since this method has a precondition of driving, not the air conditioner itself, but the compressor only, this method is less effective in determining detect in the whole air conditioner having the compressor assembled thereto.

SUMMARY OF THE INVENTION

Accordingly, the present invention is directed to device and method for detecting anomaly of an air conditioner from acoustic emission that substantially obviates one or more of the problems due to limitations and disadvantages of the related art.

An object of the present invention is to provide device and method for detecting a defect in an air conditioner from acoustic emission, which can determine defect in an air conditioner in a state assembly of the air conditioner, inclusive of a compressor, is completed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for detecting anomaly of an air conditioner, includes the steps of (1) detecting an acoustic emission signal from a compressor in the air conditioner during operation of the air conditioner, (2) detecting parameters of particular components from the detected acoustic emission signal, and (3) comparing the detected parameters to respective references, to determine anomaly of the air conditioner on the whole.

The step (1) is carried out after a preset time period is passed since the air conditioner is operated at a rated power, which assure to determine anomaly of the air conditioner only when the air conditioner is operative at a rated power.

The parameter detected in the step (2) is an AE absolute average which is a sum of signals of a frequency divided by a number of entire data, or an AE energy which is a square root of a sum of squares of the measured AE signals. It can be known from experiments that these parameters are the most basic elements for determining anomaly of the air conditioner, and the determination based on these parameters permits the most reliable determination.

In another aspect of the present invention, there is provided a method for detecting anomaly of an air conditioner, including the steps of (1) detecting an acoustic emission signal from a compressor in the air conditioner during operation of the air conditioner, (2) comparing an AE absolute average to a reference, the AE absolute average being a sum of signals of a frequency among the detected acoustic emission signal divided by a number of entire data, and (3) comparing the AE energy to a reference if it is determined in the step (2) that the AE absolute average is within a range of the reference, the AE energy being a square root of a sum of squares of the measured signals, whereby, determining the air conditioner normal only when both the AE absolute average and the AE energy are within ranges of references, respectively.

In other aspect of the present invention, there is provided a device for detecting anomaly of an air conditioner, including an acoustic sensor device to be brought into close contact with a compressor in the vicinity of a vane in the compressor, for sensing an acoustic emission signal from the compressor in the air conditioner, and a comparison and determining part for comparing an AE absolute average to a reference for determining anomaly of the air conditioner, the AE absolute average being a sum of signals of a frequency among signals detected at the sensor device divided by a number of entire data.

The comparison and determining part also compares an AE energy to a reference for determining anomaly of the air conditioner, the AE energy being a square root of a sum of squares of measured AE signals.

The device for detecting anomaly of an air conditioner of the present invention permits to detect the most accurate AE signal, and based on which anomaly of the air conditioner can be detected accurately.

The acoustic emission sensor device includes a body having an inwardly curved surface 22 to fit to an outer side form of the compressor in the air conditioner, and a sensor fitted to the inwardly curved surface for sensing the AE signal generated at the compressor, and a hand grip connected to one side of the body for user's grip.

The hand grip has a switch for controlling operation of the sensor device.

The sensor device permits the user to use the device with easy, and select a desired spot on the compressor precisely and detect the AE signal accurately.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
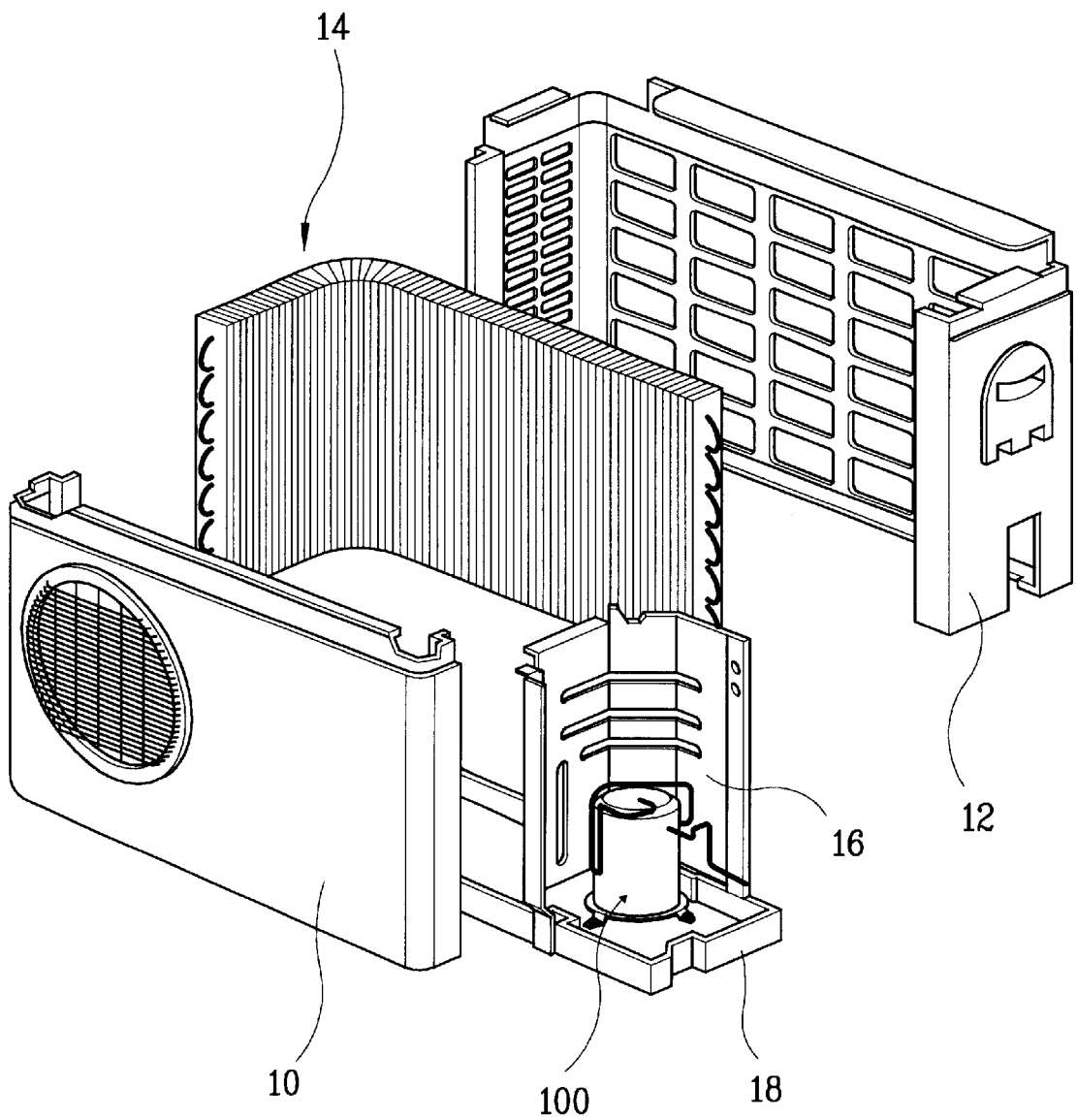
FIG. 1 illustrates a disassembled perspective view of a related art outdoor unit of an air conditioner, schematically.
Figure 2:
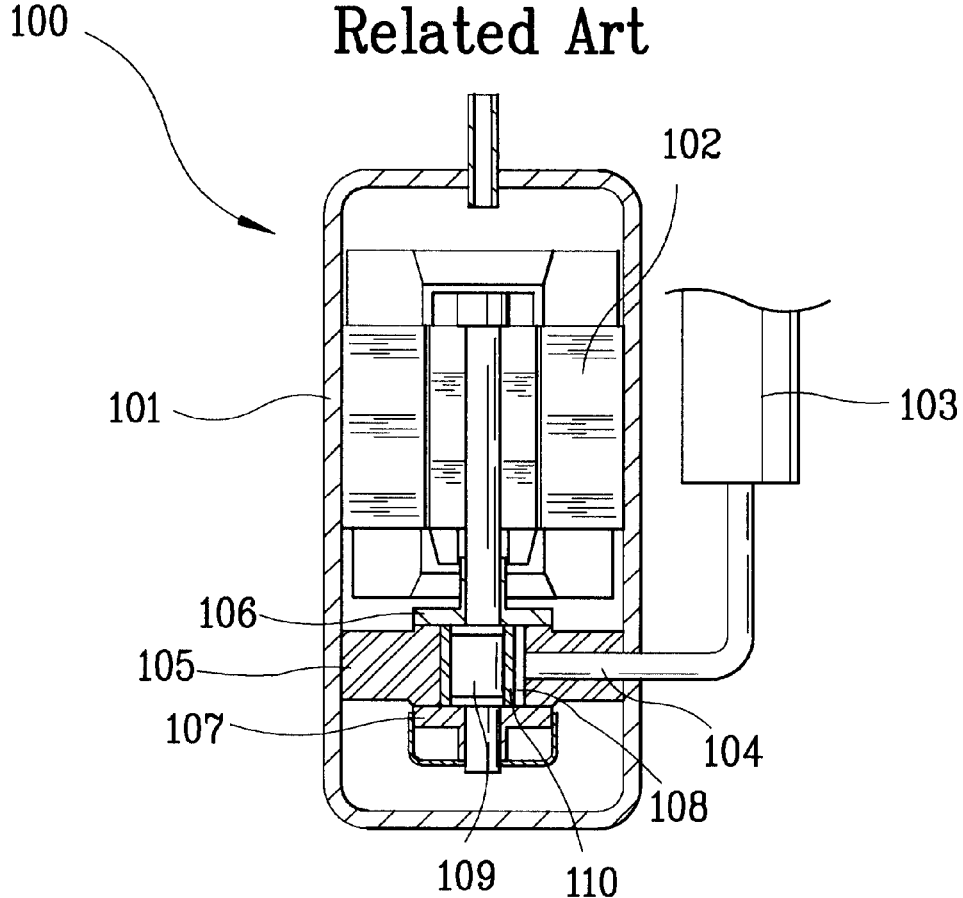
FIG. 2 illustrates a longitudinal section of a related art compressor used in an air conditioner.
Figure 3:
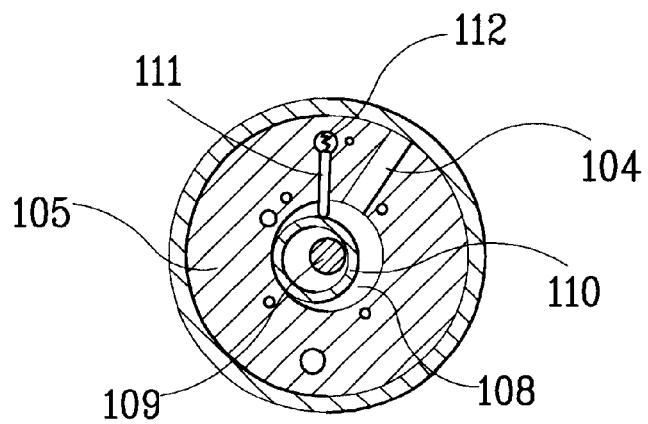
FIG. 3 illustrates a cross section of a related art compressor used in an air conditioner.

Reference will now be made in detail to the preferred embodiments of the present invention, examples of which are illustrated in the accompanying drawings. In the following explanations, FIGS. 1 or 2 will be referred to in explanations of internal structure of the compressor, if necessary.

The acoustic emission method employed in the present invention will be reviewed. In a structural body, if an impact or abrasion is caused by friction, crack, or leakage and the like, to a material, high frequency signals are generated as atoms in the material are displaced. In the acoustic method, the high frequency is detected and analyzed, to determine anomaly of the structural body. Though a non-destructive test of, such as a laser beam or an ultrasonic wave, is effective in detecting a static crack or measuring a distance, monitoring and diagnosis of a state by detecting an acoustic emission signal is effective for crack, breakage, or leakage occurred in a dynamic state. The present invention suggests to determine a defect of an air conditioner by detecting an acoustic emission signal from a compressor, which is the most important part in the air conditioner. It should be noted there is a great difference in that the method employed in the present invention is based on detection of an acoustic emission signal from a compressor in a state the entire air conditioner is at operation, while the prior art method allowed for the inventor is based on detection of an acoustic emission signal from a compressor in a state only the compressor itself is at operation. That is, the detection of the acoustic emission AE signal from a compressor in the air conditioner completed as the compressor is assembled thereto is detection of the acoustic emission signal in a state the whole air conditioner is at operation, which is meaningful in that an acoustic emission signal is detected from the entire compressor and the air conditioner operative connected thereto, actually. A sensor for the AE signal detection may be any type of sensors, such as the PICO type AE sensor.

Figure 4:
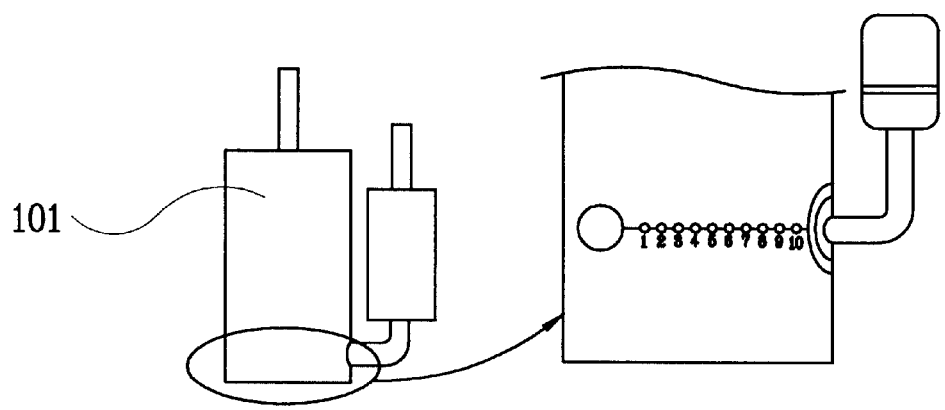
FIG. 4 illustrates an example for explaining a detecting method in accordance with a preferred embodiment of the present invention.
Figure 5:
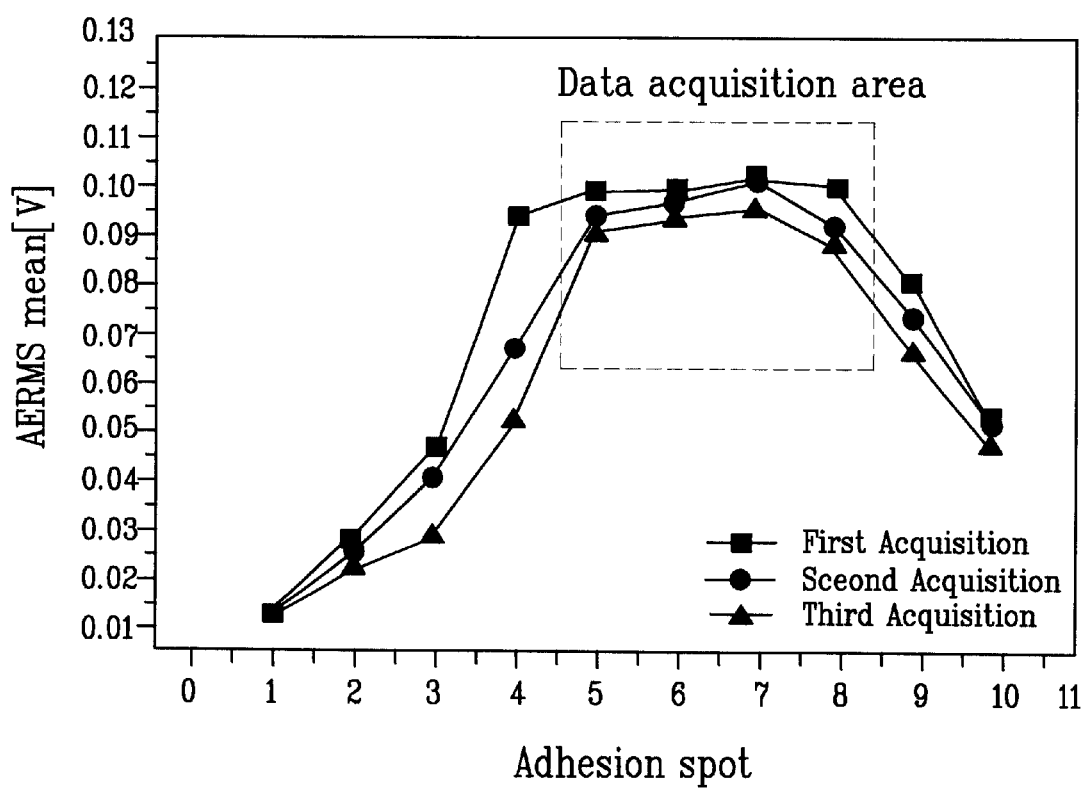
FIG. 5 illustrates a graph showing detection signals for each detection position.

Care should be taken in selecting a position the AE sensor is attached thereto for obtaining a good AE signal. A position at which occurrence of the AE signal is the most stable on the air conditioner at operation should be selected. As shown in FIGS. 4 and 5, it can be known that the most stable AE signal can be detected at a particular position from a result of detection of the AE signals from the AE sensors attached on different positions of the compressor case 101 (from Nos. 1 to 10 positions in FIG. 4). For example, the most stable AE signal is detected in the vicinity of Nos. 5~8 positions in FIG. 4, which are known to be the vicinity of the vane 111. That is, when the air conditioner is at operation, the most stable AE signal is detected in the vicinity of the vane 111 of the compressor, which can be explained in view of structure of the compressor, adequately. With reference to the structure of the compressor in FIGS. 1 and 2, when the rolling piston 110 rotates inside of the compression chamber 108 as the eccentric shaft 109 rotates, the rolling piston 110 is brought into contact with the vane 111 once per every rotation, making an impact every time. Most of the impact occurred inside of the compressor thus is converted into an acoustic signal, to exhibit the most distinctive and stable AE signal in the vicinity of the vane 111. Therefore, as can be known from FIGS. 4 and 5, the AE sensors attached in the vicinity of the vane 111 can provide the most stable and secure AE signals.

Figure 6:
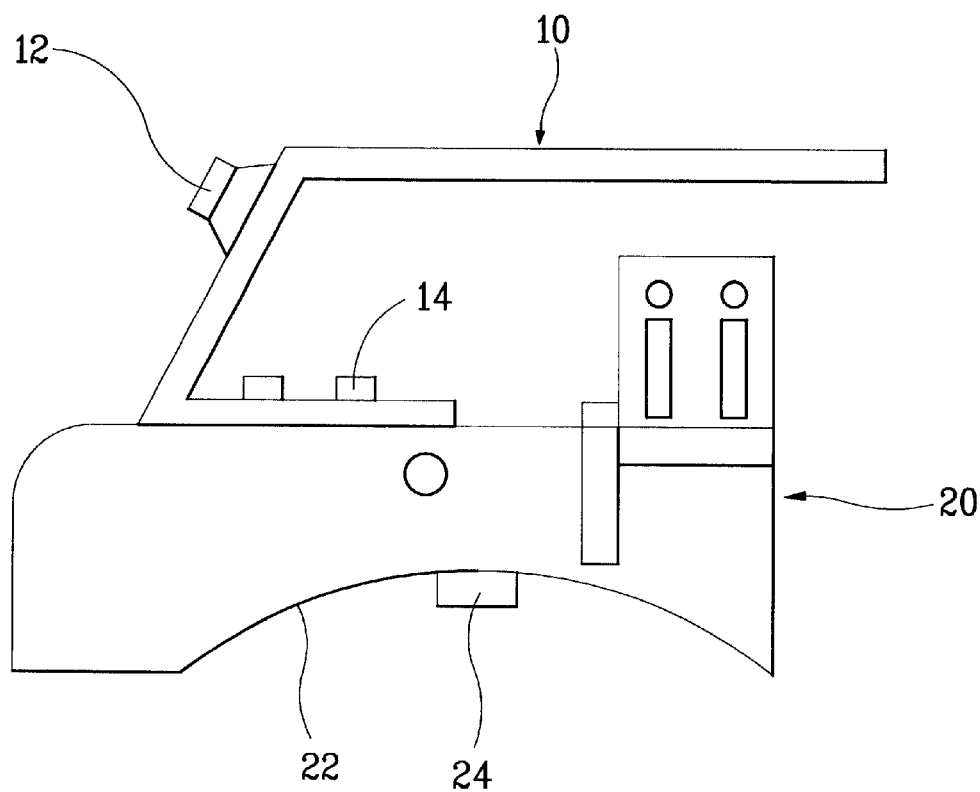
FIG. 6 illustrates a plan view of a sensor device in accordance with a preferred embodiment of the present invention.

An AE sensor device in accordance with a preferred embodiment of the present invention will be explained with reference to FIG. 6. FIG. 6 illustrates a plan view of a sensor device in accordance with a preferred embodiment of the present invention.

Referring to FIG. 6, the sensor device in accordance with a preferred embodiment of the present invention includes a body 20 having an AE sensor 24 fitted thereto, and a hand grip 10 connected to the body 20 for user's grip. The body 20 the AE sensor 24 fitted thereto has an inwardly curved surface 22 to fit to an outer side form of the compressor. The hand grip 10 and the body 20 are fastened by, for example, bolts 14. There is a switch 12 for controlling operation of the AE sensor 24 on the hand grip 10. Therefore, the user should bring the curved surface 22 to an outside surface of the compressor with the hand grip held with a hand, such that the AE sensor 24 on the curved surface 22 is brought to a position in the vicinity of the vane 111. The AE sensor device should be fabricated such that the AE signal generated at the air conditioner can be detected when the AE sensor device is brought into close contact with the compressor in the air conditioner for a preset time period during the air conditioner is moving on a production line of the air conditioner in a state assembly of the air conditioner is completed and operated at a rated power.

Figure 7:
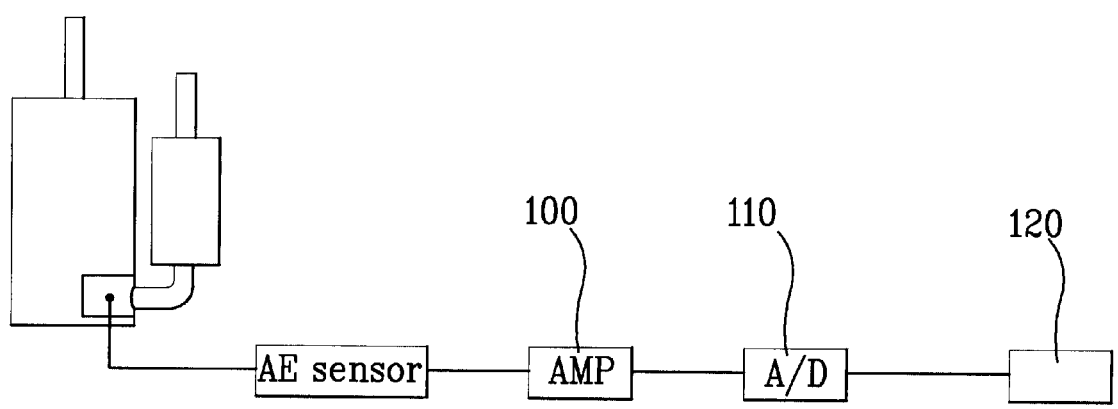
FIG. 7 illustrates a block diagram showing a concept of entire device of the present invention.

A process for detecting an AE signal by using the AE sensor device will be explained. FIG. 7 illustrates a block diagram showing a concept of entire device of the present invention.

Referring to FIG. 7, the AE sensor is brought into close contact with the compressor case 101 in the vicinity of the vane 111 to detect an AE signal generated at an air conditioner operated after being assembled on a production line. The AE signal detected thus is amplified at an amplifier 100. A filtering circuit may be built in the amplifier 100 for filtering a desired signal if necessary, or a separate filtering device may be provided, additionally. The AE signal thus amplified and filtered is provided to the comparison and determining part 120, to compare with a reference to determine anomaly of the air conditioner on the whole. For example, an industrial, or personal computer may be used as the comparison and determining part 120. As will be explained later, the comparison and determining part 120 has reference values, such as an AE absolute average, an AE energy, and a Kurtosis, and the like, for parameters for determining anomaly. It is preferable that the AE signal is detected after a preset time is passed since the air conditioner is put into operation. That is, in general since a certain time period is required until a steady state response is provided from initial operation of the air conditioner on the production line, it is preferable that the AE signal is detected by using the AE sensor at a time point the air conditioner exhibits steady state response characteristics after a while of operation. It can be known from an experiment that a time period of three to five minutes is required for the air conditioner to provide the steady state response. However, the time period required for exhibiting such steady state response characteristics is varied with capacities and operational characteristics of the air conditioners, the time period can not be fixed, without variation. references will be discussed. Since it is very large job to compare, and determine defect of all the signals obtained at the AE sensor, in order to enhance efficiency in determination of defect in the present invention, appropriate parameters are selected from the measured AE signal, and compared to respective references, in the determining defect of the air conditioner. As one of parameters for determining the defect of the air conditioner, there is an absolute average of AE, a sum of signals of a particular frequency divided by an entire number of data, which may be expressed as $$\frac{1}{N}\sum_{i=0}^{N}|x_i|.$$

Such an absolute average, representing an overall extent of occurrence of the signal to be measured, may be considered as the most important parameter. As a second parameter, there is an AE energy, a square root of a sum of squares of the AE signals, which may be expressed as $$\sqrt{\sum_{i=0}^{N}x_i^2}.$$

For example, it may be taken that the AE energy is as an area formed by a rectified high frequency signal when the high frequency signal is represented on a graph. That is, since the square operation makes the signal the more smaller when the measured signal is smaller than unity, and makes the signal the more greater when the measured signal is greater than unity, the AE energy is meaningful as a parameter which is responsive to an endurance and amplitude of the signal, and permits to remove a signal which is too small to be used. A parameter that may be taken into account in a third time may be the Kurtosis, which is an extent of peak in the obtained data. By taking the Kurtosis as a parameter, it is made possible to know whether the defect is a continuous, or burst type defect, which may be expressed as an equation shown below.

$$\frac{N\overset{N}{\underset{i=0}{Q}}(Abs_{Mean}-x_i)^4}{\left(\overset{N}{\underset{i=0}{Q}}(Abs_{Mean}-x_i)^2\right)^2}$$

$$\frac{N\overset{N}{\underset{i=0}{Q}}(Abs_{Mean}-x_i)^4}{\left(\overset{N}{\underset{i=0}{Q}}(Abs_{Mean}-x_i)^2\right)^2}$$

Figure 8A:
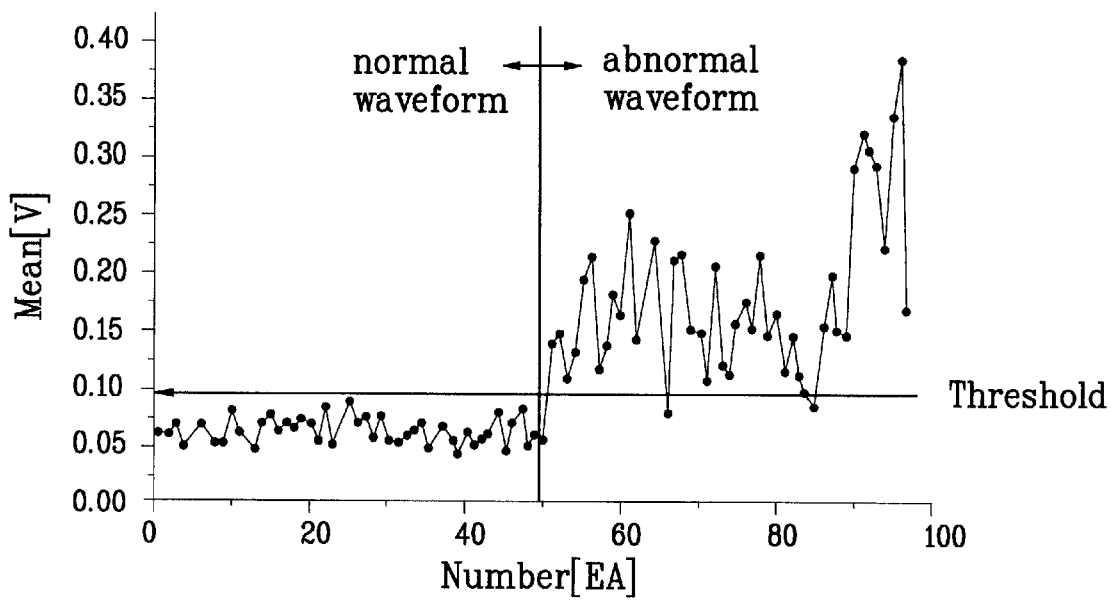
FIG. 8A illustrates a graph showing whether an average is normal.
Figure 8B:
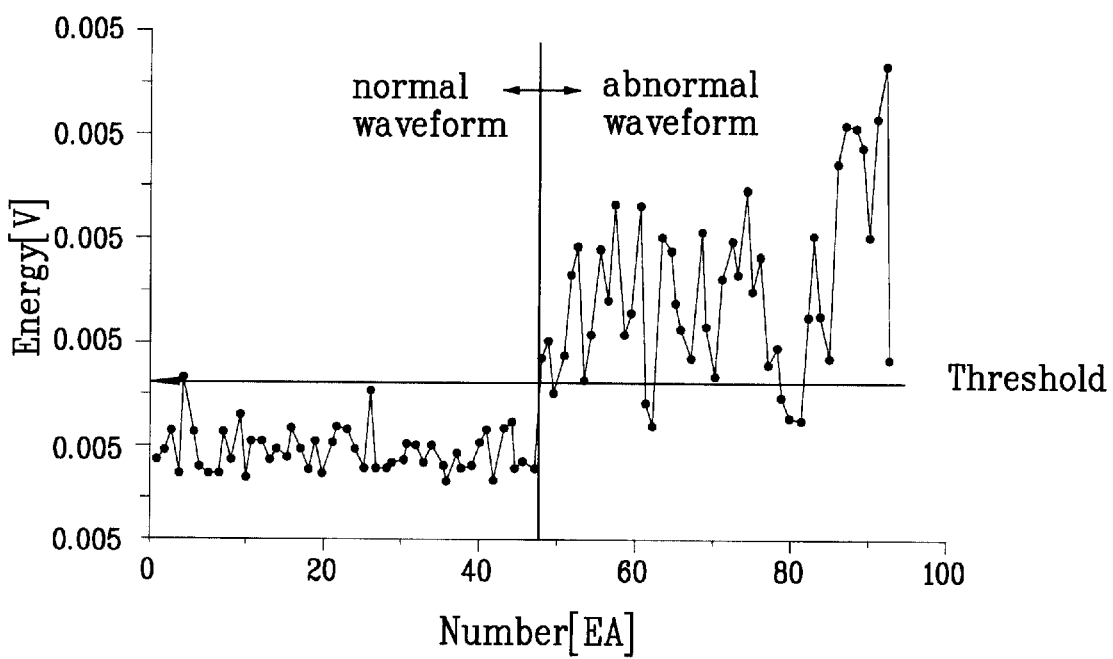
FIG. 8B illustrates a graph showing whether an energy is normal.
Figure 8C:
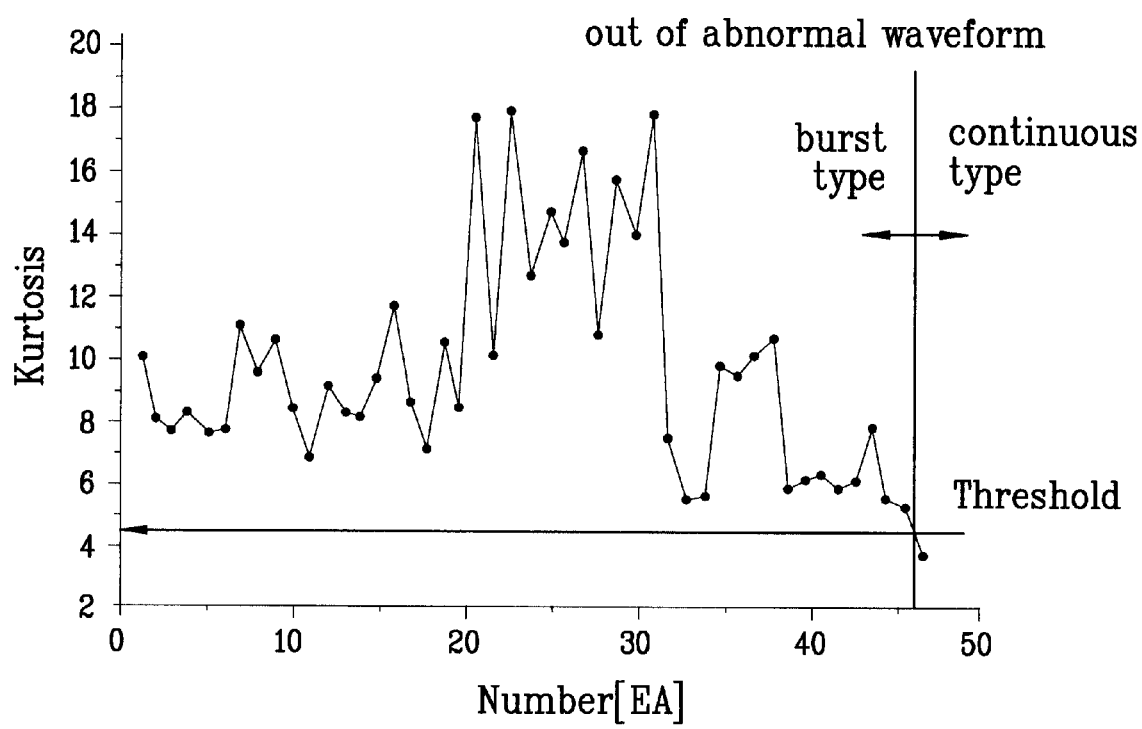
FIG. 8C illustrates a graph showing whether a Kurtosis is normal.

And, FIGS. 8A~8C illustrate graphs showing examples for determining the foregoing parameters being normal or anomalous. A reference for determining a parameter being normal or anomalous may be fixed based on data obtained through many repetitive experiments. An operation for such a parameter can be made in the comparison and determining part in FIG. 7.

Figure 9:
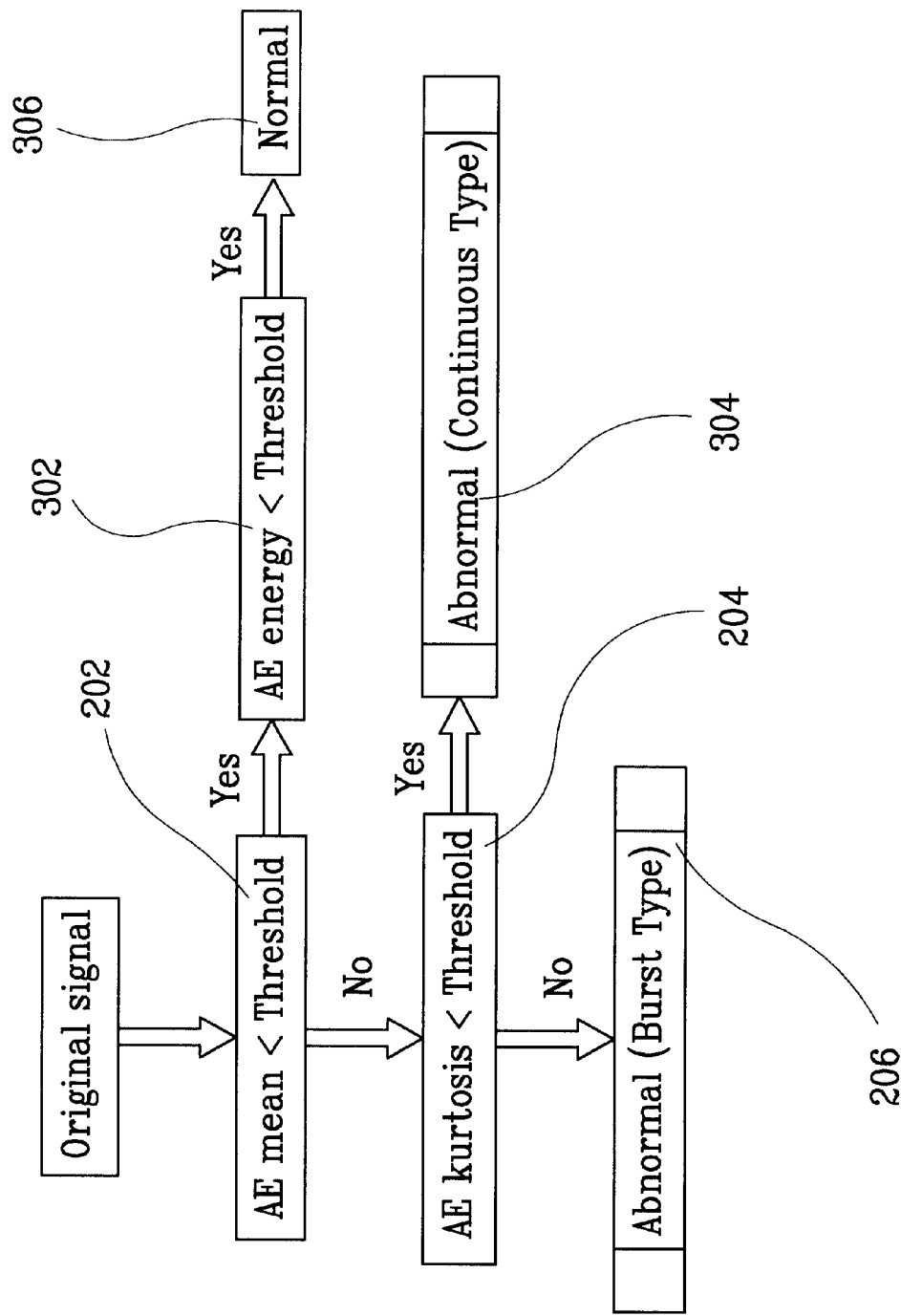
FIG. 9 illustrates a flow chart showing a method for determining anomaly in accordance with a preferred embodiment of the present invention.

The steps of determining anomaly of the air conditioner by using the foregoing parameters will be explained with reference to FIG. 9.

Upon reception of the signal obtained at the AE sensor after the signal is passed through a required process, the comparison and determining part 120 provides the parameters by calculation, which are then compared to respective references. First, in a step 202, the AE absolute average is compared to a reference. As explained, because the fact that the absolute average is determined greater than the reference as a result of the comparison implies that a sum of the signals from the air conditioner is greater than a preset reference, it is highly probable that the compressor is defective. Accordingly, in a step 204, Kurtosis is compared to the reference. If it is determined in the step 204 as a result of comparison that Kurtosis is greater than the reference, the process proceeds to a step 206 to determine the compressor being defective, actually. In this instance, if a result of the determination in the step 206 is reviewed, it can be known that Kurtosis is the sudden type with a high Kurtosis. If it is determined in the step 204 as a result of comparison that Kurtosis is smaller than the reference, the process proceeds to a step 304 to determine the compressor being anomalous. And, as a result of the determination is as explained, since the energy is in a state an unnecessary low noise is removed, if it is determined in the step 302 that the energy is higher than the reference, the compressor is determined to be anomalous in the step 304. Under the same reason explained above, it can be known that the fact that the compressor is determined to be anomalous in the step 304 implies that the anomaly is continuous. If it is determined in the step 302 that the energy is lower than the reference, the air conditioner is determined to be normal in the step 306.

It can be summarized that the above determination method is based on the following conditions. It can be known that the compressor is determined to be normal provided that the AE absolute average falls on a normal range(not exceeding the reference), and the energy does not exceed the reference. And, the references for the respective parameters can be determined based on data obtained from many experiments.

As has been explained, the device and method for detecting anomaly of an air conditioner of the present invention permits to detect anomaly of the air conditioner in a state the air conditioner is assembled fully, to allow to minimize defects in shipment of the products, to improve a product reliability.

It will be apparent to those skilled in the art that various modifications and variations can be made in the device and method for detecting anomaly of an air conditioner of the present invention without departing from the spirit or scope of the invention. Thus, it is intended that the present invention covers the modifications and variations of this invention provided they come within the scope of the appended claims and their equivalents. within the scope of the appended claims and their equivalents.

What is claimed is:

1. A device for detecting anomaly of an air conditioner, comprising:

a body having an inwardly curved surface to fit an outer side form of a compressor in an air conditioner;

a sensor fitted to the inwardly curved surface for sensing an AE signal generated at the compressor, wherein the device is brought into close contact with the compressor in the vicinity of a vane in the compressor, for sensing an acoustic emission signal from the compressor in the air conditioner; and a comparison and determining part for comparing an AE absolute average to a reference for determining anomaly of the air conditioner, the AE energy being a sum of signals of a frequency among signals detected at the sensor device divided by a number of entire data.

2. The device as claimed in claim 1, wherein the comparison and determining part also compares an AE energy to a reference for determining anomaly of the air conditioner, the AE energy being a square root of a sum of squares of measured AE signals.

3. The device as claimed in claim 1, wherein a hand grip is connected to one side of the body for user's grip.

4. A device as claimed in claim 3, wherein the hand grip has a switch for controlling operation of the sensor device.

5. A device for detecting an anomaly of an air conditioner, comprising:

a body configured to be brought into close contact with a compressor of an air conditioner; and an AE sensor fitted to the body, wherein the AE sensor is configured to sense acoustic emissions of a compressor.

6. The device of claim 5, further comprising a hand grip fastened to one side of the body.

7. The device of claim 5, further comprising a switch for controlling an operation of the AE sensor.

8. The device of claim 5, wherein the comparison and determining part determines that the acoustic signal of the compressor is abnormal if the average of the detected amplitudes exceeds the reference value.

9. A device for detecting anomaly of an air conditioner, comprising:

a body having an inwardly curved surface configured to fit an outer side form of a compressor in an air conditioner;

means for detecting acoustic emissions from a compressor in the air conditioner during operation of the air conditioner; and means for determining whether the compressor is abnormal based on an output of the detecting means.

10. The device of claim 9, wherein the detecting means is configured to record acoustic emissions for a predetermined period of time.

11. The device of claim 10, wherein the determining means is configured to calculate an average of the acoustic emissions recorded during the predetermined period of time.

12. The device of claim 9, further comprising means for detecting parameters of particular components from the detected acoustic emissions.

13. The device of claim 12, further comprising means for comparing the detected parameters to a reference value, to determine anomaly of the air conditioner.

14. The device of claim 13, wherein the parameter detected is an AE absolute average, which is an average of a plurality of detected acoustic emissions.

15. The device of claim 13, wherein the parameter detected is an AE energy, which is a square root of a sum of detected acoustic emissions.

* * * * *